US012049083B2

(12) United States Patent
Hirai et al.

(10) Patent No.: US 12,049,083 B2
(45) Date of Patent: Jul. 30, 2024

(54) LIQUID EJECTING DEVICE

(71) Applicant: SEIKO EPSON CORPORATION, Tokyo (JP)

(72) Inventors: Yasuaki Hirai, Shiojiri (JP); Kazumitsu Bunazawa, Matsumoto (JP)

( * ) Notice: Subject to any disclaimer, the term of this patent is extended or adjusted under 35 U.S.C. 154(b) by 97 days.

(21) Appl. No.: 17/930,191

(22) Filed: Sep. 7, 2022

(65) Prior Publication Data

US 2023/0079381 A1 Mar. 16, 2023

(30) Foreign Application Priority Data

Sep. 7, 2021 (JP) ................................ 2021-145314

(51) Int. Cl.
*B41J 2/165* (2006.01)

(52) U.S. Cl.
CPC ................................ *B41J 2/16523* (2013.01)

(58) Field of Classification Search
CPC .................................................. B41J 2/16523
See application file for complete search history.

(56) References Cited

U.S. PATENT DOCUMENTS

| | | | |
|---|---|---|---|
| 5,907,336 | A | 5/1999 | Hayakawa |
| 2017/0259573 | A1 | 9/2017 | Iida |

FOREIGN PATENT DOCUMENTS

| | | | | |
|---|---|---|---|---|
| JP | H0952374 A | 2/1997 | | |
| JP | 2003039706 A | 2/2003 | | |
| JP | 2008238431 A | 10/2008 | | |
| JP | 6197536 B2 * | 9/2017 | .......... | B41J 2/16508 |
| JP | 2017164915 A | 9/2017 | | |

* cited by examiner

*Primary Examiner* — Justin Seo
(74) *Attorney, Agent, or Firm* — Pramod Chintalapoodi

(57) ABSTRACT

A liquid ejecting device includes a liquid ejecting portion configured to eject liquid from a nozzle, a closed space forming portion having a porous member inside thereof, and configured to form a closed space in which the nozzle opens, an discharging portion configured to discharge the liquid in the closed space forming portion, and a control portion configured to, when an amount of the liquid ejected from the liquid ejecting portion into the closed space forming portion reaches a prescribed value, cause the discharging portion to discharge the liquid in the closed space forming portion, wherein the control unit decreases the prescribed value as the number of stops increases, the number of stops being the number of times the liquid ejecting portion is stopped for a prescribed time or longer at a position other than a closed position where the closed space is formed.

10 Claims, 3 Drawing Sheets

LIQUID EJECTING DEVICE

The present application is based on, and claims priority from JP Application Serial Number 2021-145314, filed Sep. 7, 2021, the disclosure of which is hereby incorporated by reference herein in its entirety.

BACKGROUND

1. Technical Field

The present disclosure relates to a liquid ejecting device such as a printer.

2. Related Art

For example, there is a printer that is an example of a liquid ejecting device that ejects ink, which is an example of liquid, and performs printing, as in JP 2017-164915 A. The printer includes an ink jet head, which is an example of a liquid ejecting portion, a cap, which is an example of a closed space forming portion, and a pump, which is an example of an discharging portion. The ink jet head ejects ink from a nozzle onto recording paper, which is an example of a medium, and performs printing. The cap forms a sealed space covering the nozzle, thereby suppressing drying of the ink in the nozzle.

The ink jet head performs flushing for ejecting the ink from the nozzle to the cap. The flushing is performed to keep the ink jet head in a state suitable for printing. The pump performs empty suction for causing the ink accumulated in the cap to be discharged from the cap. The empty suction is performed with the printing is caused to be stopped.

An amount of liquid that the closed space forming portion can accommodate depends on a state of the closed space forming portion. For example, when the closed space forming portion is left in a state of being opened, solvent may evaporate to make it difficult for the liquid in the closed space forming portion to be discharged. In a state where the liquid remains in the closed space forming portion, an amount of the liquid that can be further accommodated is reduced. When timing at which the liquid is caused to be discharged from the closed space forming portion is set in accordance with a case where the amount that can be accommodated is reduced, emission of the liquid is frequently performed. Printing is stopped each time the liquid emission is performed.

SUMMARY

A liquid ejecting device for solving the above-mentioned problems includes a liquid ejecting portion configured to eject liquid from a nozzle, a closed space forming portion including, inside thereof, a porous member configured to absorb the liquid, and configured to form a closed space in which the nozzle opens, an discharging portion configured to discharge the liquid in the closed space forming portion, and a control portion configured to, when an amount of the liquid ejected from the liquid ejecting portion to the closed space forming portion reaches a prescribed value, cause the discharging portion to discharge the liquid in the closed space forming portion, wherein the liquid ejecting portion is movable from a closed position where the closed space is formed, and the control portion decreases the prescribed value as the number of stops increases, the number of stops being the number of times the liquid ejecting portion is stopped for a prescribed time or longer at a position other than the closed position.

DESCRIPTION OF EXEMPLARY EMBODIMENTS

Figure 1:
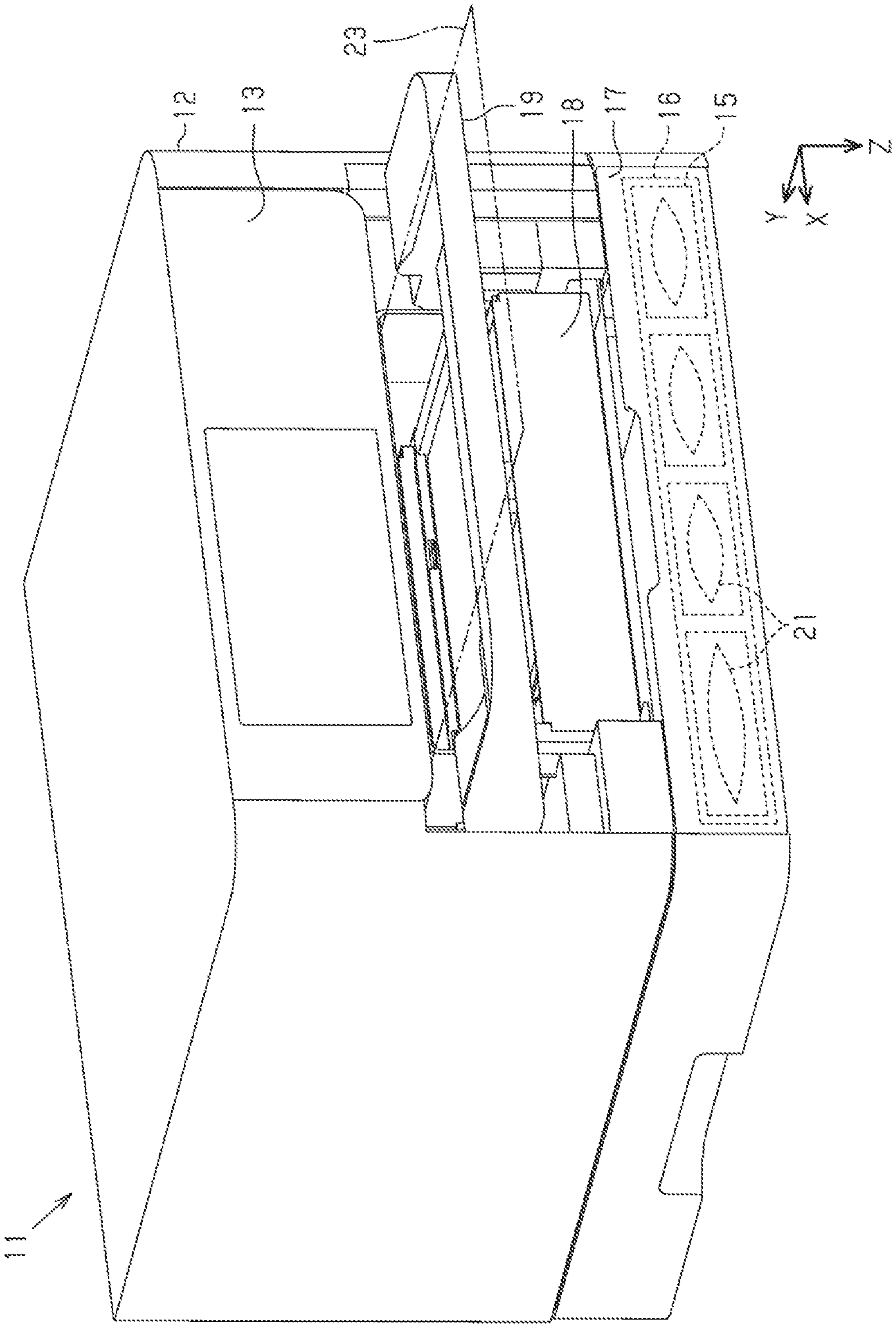
FIG. 1 is a perspective view of an exemplary embodiment of a liquid ejecting device.

An exemplary embodiment of a liquid ejecting device will be described below with reference to the accompanying drawings. The liquid ejecting device is, for example, an ink-jet type printer configured to eject ink, which is an example of liquid, on a medium such as paper and to perform printing. In the drawings, a direction of gravity is indicated by a Z-axis while assuming that a liquid ejecting device 11 is placed on a horizontal surface, and directions along the horizontal surface are indicated by an X-axis and a Y-axis. The X-axis, the Y-axis, and the Z-axis are mutually orthogonal.

Liquid Ejecting Device

As illustrated in FIG. 1, the liquid ejecting device 11 may include an exterior body 12, and an operating panel 13. The operation panel 13 is for a user to operate the liquid ejecting device 11. The operation panel 13 may include a touch panel, or may include a button (not illustrated).

The liquid ejecting device 11 may include a container 15, a mounting portion 16, a front lid 17, a medium accommodating unit 18, and an emission tray 19.

The container 15 is detachably mounted to the mounting portion 16. The container 15 can hold a liquid accommodating body 21. The liquid accommodating body 21 is detachable from the container 15 removed from the mounting portion 16. The container 15 is mounted on the mounting portion 16, thereby allowing liquid supply to the liquid ejecting device 11 from the liquid accommodating body 21 held by the container 15. The liquid ejecting device 11 may include one or more containers 15.

The liquid ejecting device 11 may supply liquid from a plurality of the liquid accommodating bodies 21. The plurality of liquid accommodating bodies 21 may be held together in one container 15, or may be divided and held in a plurality of the containers 15. The liquid ejecting device 11 of the present exemplary embodiment includes four containers 15, and each container 15 can hold one liquid accommodating body 21. A plurality of the liquid accommodating bodies 21 may contain different types of liquids, respectively. The different types of liquids are, for example, inks having different colors. In the present exemplary embodiment, four colors of inks of black, cyan, magenta, and yellow are supplied to the liquid ejecting device 11.

The front lid 17 is provided so as to be openable and closeable by rotating, for example. The closed front lid 17 covers the mounting portion 16, and the container 15 mounted at the mounting portion 16. The open front lid 17 causes the mounting portion 16 and the container 15 to be exposed.

The medium accommodating unit 18 can be loaded with a plurality of the media 23. The medium 23 fed from the medium accommodating unit 18 is discharged to the emission tray 19 after printing. The emission tray 19 receives the medium 23 after printing.

Figure 2:
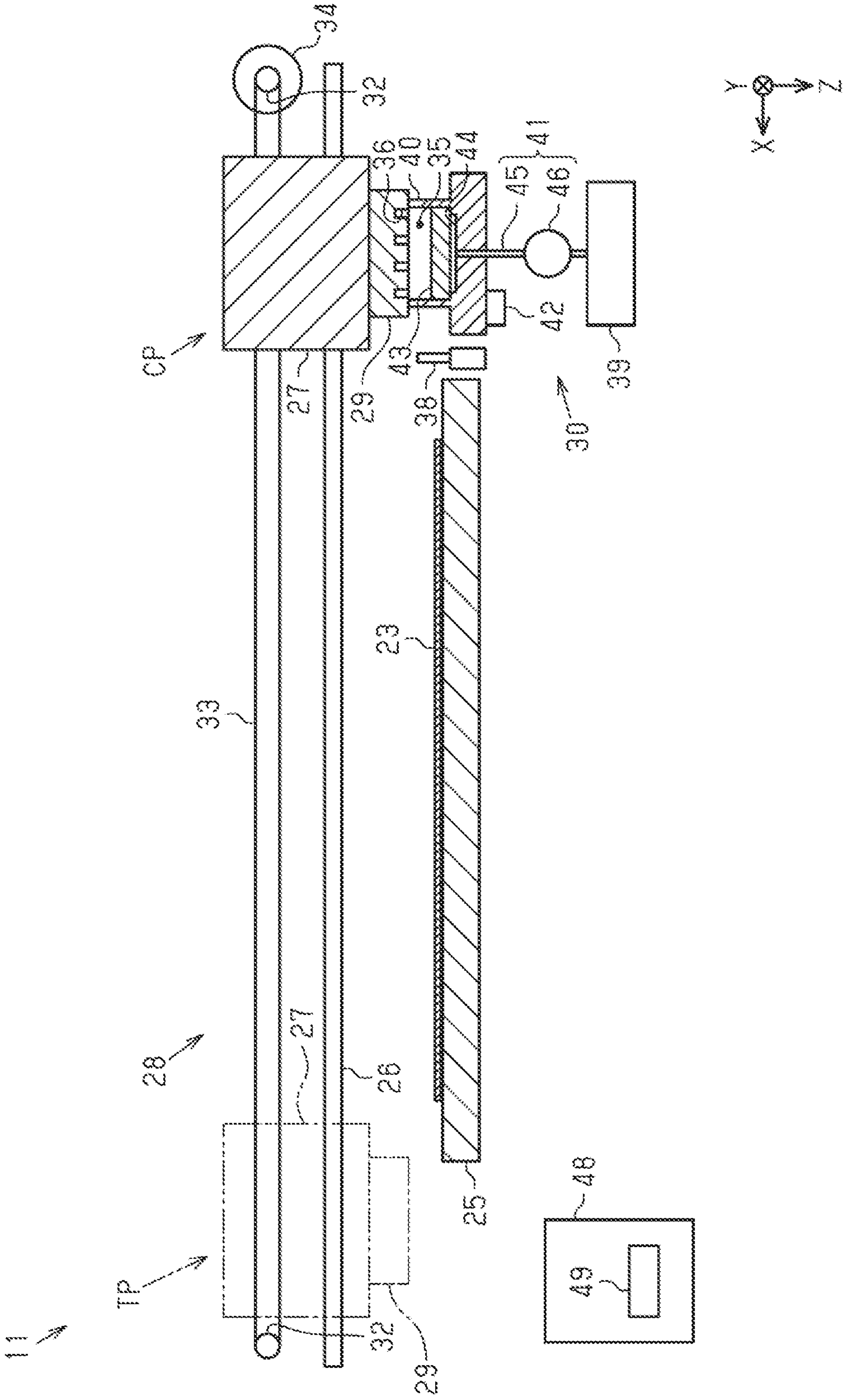
FIG. 2 is a schematic view illustrating an inner configuration of the liquid ejecting device.

As illustrated in FIG. 2, the liquid ejecting device 11 may include a medium support portion 25, a guide shaft 26, a carriage 27, and a movement mechanism 28. The liquid ejecting device 11 includes a liquid ejecting portion 29 and a maintenance unit 30.

The medium support portion 25 can support the medium 23. The guide shaft 26 guides movement of the carriage 27. The carriage 27 holds the liquid ejecting portion 29.

The movement mechanism 28 causes the carriage 27 and the liquid ejecting portion 29 to reciprocate along the guide shaft 26. The movement mechanism 28 of the present exemplary embodiment includes a pair of pulleys 32, a belt 33, and a motor 34.

The pair of pulleys 32 are provided spaced apart from each other. The belt 33 of the present exemplary embodiment is endless. The belt 33 is wound on the pair of pulleys 32. The motor 34 causes one of the pulleys 32 to rotate to rotate the belt 33. A part of the belt 33 is mounted to the carriage 27.

The movement mechanism 28 causes the carriage 27 to move by driving the motor 34. The movement mechanism 28 causes the carriage 27 and the liquid ejecting portion 29 to move between a closed position CP indicated by a solid line in FIG. 2 and a turn position TP indicated by a two-dot chain line in FIG. 2. The closed position CP is a position where a closed space 35 is formed by the maintenance unit 30. That is, the liquid ejecting portion 29 is movable from the closed position CP where the closed space 35 is formed. The carriage 27 and the liquid ejecting portion 29 stand by at the closed position CP during non-printing in which printing is not performed.

Liquid Ejecting Portion

The liquid ejecting portion 29 can eject liquid from a nozzle 36. The liquid ejecting portion 29 ejects a particulate liquid drop by drop from a plurality of the nozzles 36. In the present exemplary embodiment, the particulate liquid is also referred to as a droplet. The liquid ejecting portion 29 ejects droplets while moving, and performs printing on the medium 23 supported by the medium support portion 25.

Maintenance Unit

The maintenance unit 30 maintains the liquid ejecting portion 29. The maintenance unit 30 may include a wiping portion 38, and a waste liquid accommodating portion 39. The maintenance unit 30 includes a closed space forming portion 40, an discharging portion 41, and a detector 42.

The wiping portion 38 can wipe the liquid ejecting portion 29. The wiping portion 38 is movably provided between a wiping position (not illustrated) and a non-wiping position illustrated in FIG. 2. The wiping position is a position where the wiping portion 38 can contact the liquid ejecting portion 29. The non-wiping position is a position where the wiping portion 38 does not contact the liquid ejecting portion 29. The wiping portion 38 located at the wiping position is in contact with the moving liquid ejecting portion 29, to wipe the liquid ejecting portion 29. The maintenance by the wiping portion 38 for wiping the liquid ejecting portion 29 is also referred to as wiping.

Closed Space Forming Portion

The closed space forming portion 40 can form the closed space 35 in which the nozzle 36 opens. The closed space forming portion 40 is provided so as to be movable between a capping position illustrated in FIG. 2, and a separation position (not illustrated). The capping position is a position where the closed space forming portion contacts the liquid ejecting portion 29. The closed space forming portion 40 located at the capping position forms the closed space 35 between the closed space forming portion 40 and the liquid ejecting portion 29 located at the closed position CP. That is, the closed position CP is a position where the closed space 35 is formed. The closed space forming portion 40 covers the nozzle 36 by forming the closed space 35.

The maintenance by the closed space forming portion 40 for forming the closed space 35 is also referred to as capping. The maintenance unit 30 suppresses drying of liquid in the nozzle 36 and the closed space forming portion 40 by performing the capping. The closed space forming portion 40 caps the liquid ejecting portion 29 located at the closed position CP. The closed space forming portion 40 is moved from the capping position to the separation position to open the closed space 35.

The closed space forming portion 40 includes a porous member 43 capable of absorbing liquid. The closed space forming portion 40 may have one or more grooves 44 formed in a bottom surface. The porous member 43 may be provided above the groove 44 so as to cover the groove 44.

The closed space forming portion 40 receives liquid ejected separately from printing from the liquid ejecting portion 29. The maintenance by the liquid ejecting portion 29 for ejecting liquid to the closed space forming portion 40 is also referred to as flushing. The closed space forming portion 40 may receive liquid ejected by the flushing in a state of being located at the separation position. The liquid ejecting portion 29 prevents viscosity of liquid in the nozzle 36 from increasing by performing the flushing.

Discharging Portion

The discharging portion 41 can discharge liquid in the closed space forming portion 40. The discharging portion 41 of the present exemplary embodiment includes an emission path 45 and a pump 46.

An upstream end of the emission path 45 is coupled to the closed space forming portion 40. The upstream end of the emission path 45 may open in the groove 44. By providing the groove 44 between the emission path 45 and the porous member 43, suction force of the pump 46 easily acts on a wide range of the porous member 43. Therefore, liquid remaining in the porous member 43 can be reduced. A downstream end of the emission path 45 is coupled to the waste liquid accommodating portion 39. A part of the emission path 45 may be configured with a tube that deforms along with movement of the closed space forming portion 40.

The pump 46 may be provided in the middle of the emission path 45. The pump 46 reduces a pressure inside the closed space forming portion 40 via the emission path 45. The pump 46 may cause a pressure inside the closed space 35 to be reduced to forcibly discharge liquid from the nozzle 36. The maintenance for causing the pressure inside the closed space 35 to be reduced to discharge liquid is also referred to as suction cleaning.

When the pump 46 is driven with the closed space 35 open, liquid in the closed space forming portion 40 is discharged. The maintenance for causing liquid inside the closed space forming portion 40 to be discharged is also referred to as empty suction. The liquid discharged in accordance with the suction cleaning and the empty suction is sent to the waste liquid accommodating portion 39. The waste liquid accommodating portion 39 accommodates, as a waste liquid, the liquid discharged from the liquid ejecting portion 29 in accordance with the maintenance. The waste liquid accommodating portion 39 may be detachably provided.

Detector

The detector 42 detects an amount of liquid ejected from the liquid ejecting portion 29 to the closed space forming portion 40. The detector 42 may be, for example, a balance for measuring weight of the closed space forming portion 40. When the detector 42 is a balance, the detector 42 may perform detection based on an amount of liquid ejected, and a difference between weight before the liquid is ejected and weight after the liquid is ejected. The detector 42 may be a sensor capable of detecting droplets ejected from the nozzle 36. The detector 42 may detect an amount of liquid ejected, based on the detected number of droplets.

Control Portion

The liquid ejecting device 11 includes a control portion 48. The control portion 48 comprehensively controls driving of each mechanism in the liquid ejecting device 11, and controls various operations performed by the liquid ejecting device 11.

The control portion 48 can be constituted as a: one or more processors that perform various types of processing in accordance with a computer program, one or more dedicated hardware circuits that perform at least a part of the various types of processing, or y: a circuit including a combination of the above. The hardware circuit is, for example, an application-specific integrated circuit. The processor includes a CPU, and memories such as a RAM and a ROM, and the memory stores a program code or a command configured to cause the CPU to perform the processing. The memory, or a computer readable medium includes any readable medium accessible by a general purpose or special purpose computer.

The control portion 48 may include a calculation unit 49. The calculation unit 49 may function as a detector for detecting an amount of liquid ejected from the liquid ejecting portion 29 to the closed space forming portion 40. When the calculation unit 49 functions as a detector, the liquid ejecting device 11 may be configured not to include the detector 42.

The calculation unit 49 of the present exemplary embodiment counts the number of droplets that the liquid ejecting portion 29 was caused to eject. In other words, the calculation unit 49 may calculate an amount of liquid ejected from the liquid ejecting portion 29 to the closed space forming portion 40, by multiplying the number of droplets ejected at the closed position CP by the liquid ejecting portion 29, and an amount of liquid per drop.

Stop Routine

Next, a stop routine will be described with reference to a flowchart illustrated in FIG. 3. The control portion 48 executes the stop routine at timing at which the liquid ejecting portion 29 is stopped during printing, for example.

Figure 3:
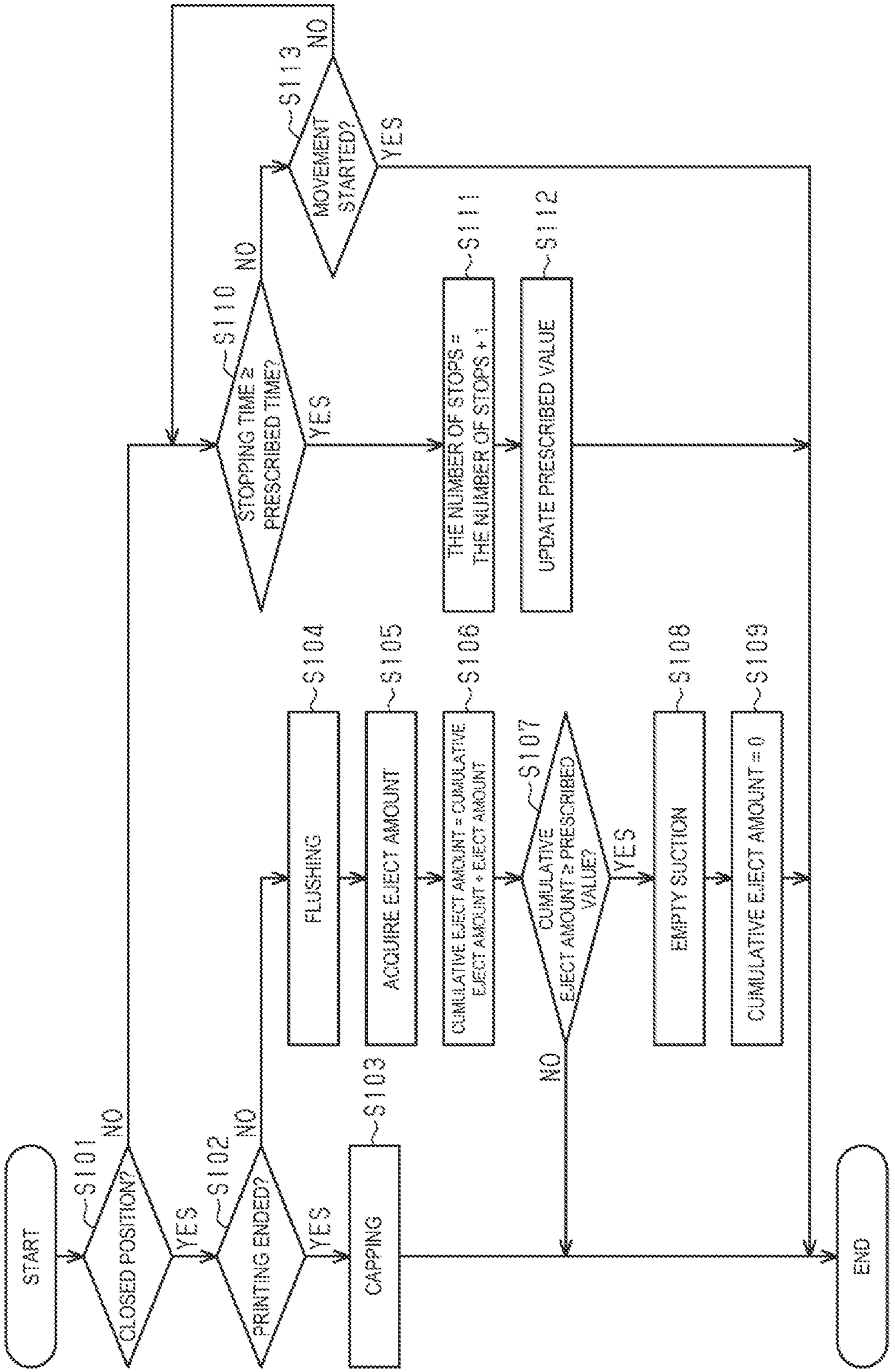
FIG. 3 is a flowchart illustrating a stop routine.

As illustrated in FIG. 3, in step S101, the control portion 48 determines whether a position at which the liquid ejecting portion 29 is stopped is the closed position CP or not. When the liquid ejecting portion 29 is stopped at the closed position CP, step S101 ends with YES, and the control portion 48 moves the processing to step S102.

In step S102, the control portion 48 determines whether printing ended or not. When the printing ended, step S102 ends with in YES, and the control portion 48 moves the processing to step S103. In step S103, after causing the closed space forming portion 40 to move to a capping position to perform capping, the control portion 48 ends the stop routine.

In step S102, when the printing is in progress, step S102 ends with NO, and the control portion 48 moves the processing to step S104. In step S104, the control portion 48 causes the liquid ejecting portion 29 to eject liquid to perform the flushing.

In step S105, the control portion 48 acquires an eject amount ejected in step S104 from the detector 42 or the calculation unit 49. In step S106, the control portion 48 adds the eject amount acquired in step S104 to a cumulative eject amount stored to update a cumulative eject amount to store.

In step S107, the control portion 48 determines whether the cumulative eject amount is equal to or greater than a prescribed value or not. When the cumulative eject amount is equal to or greater than the prescribed value, step S107 ends with YES, and the control portion 48 moves the processing to step S108. In step S108, the control portion 48 causes the pump 46 to drive to perform empty suction. In step S109, the control portion 48 updates the cumulative eject amount to store to zero.

When the cumulative eject amount is less than the prescribed value in step S107, step S107 ends with NO, and the control portion 48 ends the stop routine.

In step S101, when the liquid ejecting portion 29 is stopped at a position other than the closed position CP, step S101 ends with NO, and the control portion 48 moves the processing to step S110. In step S110, the control portion 48 determines whether stopping time elapsed since the liquid ejecting portion 29 is stopped is equal to or greater than prescribed time or not.

When the stopping time is equal to or greater than the prescribed time, step S110 ends with YES, and the control portion 48 moves the processing to step S111. In step S111, the control portion 48 adds 1 to the number of stops stored and updates the number of stops. In step S112, the control portion 48 updates the prescribed value based on the number of stops.

In step S110, when the stopping time is less than the prescribed time, step S110 ends with NO, and the control portion 48 moves the processing to step S113. In step S113, the control portion 48 determines whether the liquid ejecting portion 29 started moving or not.

When the liquid ejecting portion 29 is stopped, step S113 ends with NO, and the control portion 48 moves the processing to step S110. When the liquid ejecting portion 29 moves, step S113 ends with YES, and the control portion 48 ends the stop routine.

Liquid

The liquid ejecting portion 29 of the present exemplary embodiment can eject a first liquid and a second liquid as liquid. The second liquid has a defoaming property lower than that of the first liquid. That is, the second liquid has surface tension lower than that of the first liquid, and foam is unlikely to disappear.

A forming property and a defoaming property of liquid can be evaluated in the following manner. The foaming property means ease of foaming of liquid.

[1] 20 g of liquid to be evaluated is measured and put in a screw tube with a capacity of 100 g.

[2] A liquid surface height from a bottom surface of the screw tube to a liquid surface is measured.

[3] The screw tube is shaken 20 times with an interval of about 20 cm.

[4] A foaming height from the bottom surface of the screw tube to a top of the highest foam immediately after the shaking is measured.

[5] A foam height is calculated with Equation (1) below.

$$\text{Foam Height}=(\text{Forming Height Immediately After Shaking})-(\text{Liquid Surface Height Before Shaking}) \quad (1)$$

[Mathematical Equation 1]

[6] Time is measured until the foam disappears immediately after the shaking. Specifically, time is measured until the liquid surface with a diameter of approximately 1 cm without the foam is visible. At this time, a lid of the screw tube may be left closed. However, for example, it may be difficult to recognize a liquid having a dark color such as black, from a side. In this case, it may be easier to see the liquid by shining light from a short distance. In a case of a liquid where foam cannot be recognized from a side, the lid may be opened for recognition so gently as not to apply vibration.

For a liquid having a high foaming property, the foam height in [5] is greater than that of a liquid having a low foaming property.

For a liquid having a high defoaming property, time until the foam in [6] disappears is shorter than that for a liquid having a low defoaming property. The foaming height may be measured over time. The defoaming property may be determined from a change in the foam height calculated over time.

When the liquid ejecting portion 29 ejects a plurality of types of liquids, a liquid having a higher defoaming property of any two types of liquids may be the first liquid, and a liquid having a lower defoaming property may be the second liquid. Any two types of liquids may be a liquid having the highest defoaming property of a plurality of types of liquids, and a liquid having the lowest defoaming property, or may be a liquid having the lowest defoaming property and another type of liquid.

For liquids used in the present exemplary embodiment, a magenta ink has the highest defoaming property, and the defoaming property decreases for a yellow ink, a black ink, and a cyan ink in order. In this case, for example, the magenta ink may be the first liquid, and the cyan ink may be the second liquid.

When the liquid ejecting portion 29 ejects more than three types of liquids, a liquid in a high defoaming property group may be the first liquid, and a liquid in a low defoaming property group may be the second liquid. Specifically, for example, the magenta ink and the yellow ink may be the first liquids, and the black ink and the cyan ink may be the second liquids. For example, the magenta ink, the yellow ink, and the black ink may be the first liquids, and the cyan ink may be the second liquid.

After ejecting the first liquid to the closed space forming portion 40, the liquid ejecting portion 29 may eject the second liquid to the closed space forming portion 40. An amount of the second liquid ejected by the liquid ejecting portion 29 to the closed space forming portion 40 may be greater than an amount of the first liquid ejected by the liquid ejecting portion 29 to the closed space forming portion 40. For example, when the magenta ink is the first liquid, and the cyan ink is the second liquid, the liquid ejecting portion 29 may eject a first amount of the first liquid, and then eject a second amount of the second liquid, which is larger than the first amount, to perform the flushing.

The control portion 48, before causing the discharging portion 41 to discharge liquid in the closed space forming portion 40, may cause the second liquid to be ejected from the liquid ejecting portion 29 to the closed space forming portion 40. For example, the control portion 48, after causing the liquid ejecting portion 29 to eject the cyan ink, may cause the empty suction to be performed.

The Number of Stops

The number of stops is the number of times the liquid ejecting portion 29 is stopped for a prescribed time or longer at a position other than the closed position CP. That is, the number of stops is the number of times the closed space forming portion 40 is opened for the prescribed time or longer. For example, the prescribed time is a period of time that is longer than time for the liquid ejecting portion 29 to pause at the turn position TP in order to change a moving direction.

When supply of power to the liquid ejecting device 11 is interrupted while the liquid ejecting portion 29 is moving, the liquid ejecting portion 29 may be stopped before returning to the closed position CP. Thus, the number of stops may include the number of times the liquid ejecting portion 29 is stopped for the prescribed time or longer at a position other than the closed position CP when the liquid ejecting device is unplugged while being supplied with electric power.

The number of stops may include the number of times the liquid ejecting portion 29 is stopped for the prescribed time or longer at a position other than the closed position CP due to the medium 23 jamming on a transport path. The control portion 48 may cause driving of the motor 34 to be stopped when a load of the motor 34 increases. For example, when the medium 23 or the like hits the liquid ejecting portion 29 or the carriage 27, and movement of the liquid ejecting portion 29 is interrupted, the control portion 48 may cause the movement of the liquid ejecting portion 29 to be stopped at a position other than the closed position CP.

Action

As shown in Table 1, the control portion 48 of the present exemplary embodiment changes a prescribed value, the number of ejects, and drive time according to the number of stops. The control portion 48 stores a prescribed value corresponding to the number of stops. The control portion 48 may store a prescribed value, the number of ejects, and drive time in association with the number of stops. The number of combinations of the number of stops, a prescribed value, the number of ejects, and drive time stored by the control portion 48 may be two. The control portion 48 of the present exemplary embodiment stores a prescribed value, the number of ejects, and drive time, for each of the numbers of stops from 0 to 4.

TABLE 1

| The number of stops (times) | 0 | 1 | 2 | 3 | 4 |
|---|---|---|---|---|---|
| Prescribed value [g] | 5.0 | 3.0 | 2.0 | 1.0 | 0.5 |
| Drive time [sec] | 3 | 4 | 5 | 6 | 7 |
| The number of ejects [drops] | 100 | 300 | 900 | 3000 | 9000 |

The control portion 48 reduces the prescribed value as the number of stops increases. When the number of stops is 0, the control portion 48 may set the prescribed value to 5.0 g, for example. When the number of stops is one, the control portion 48 may change the prescribed value to 3.0 g, for example. Similarly, the control portion 48 may set the prescribed value to 2.0 g when the number of stops is two, for example, may set the prescribed value to 1.0 g when the number of stops is three, for example, and may set the prescribed value to 0.5 g when the number of stops is four, for example.

The control portion 48, when causing the discharging portion 41 to discharge the liquid in the closed space forming portion 40, may increase the drive time thereof, as the number of stops increases. In other words, the control portion 48, when causing the pump 46 to perform the empty suction, may change the drive time driving thereof in accordance with the number of stops.

When the number of stops is 0, the control portion 48 may set the drive time to three seconds, for example. When the number of stops is one, the control portion 48 may change the drive time to four seconds, for example. Similarly, the control portion 48 may set the drive time to five seconds when the number of stops is two, for example, may set the drive time to six seconds when the number of stops is three, for example, and may set the drive time to seven seconds when the number of stops is four, for example.

While printing is not performed, the liquid ejecting portion 29 is located at the closed position CP, and the closed space forming portion 40 is located at the capping position. When printing is started, the control portion 48 causes the closed space forming portion 40 to move to the separation position. The control portion 48 may cause the flushing to be performed before causing the liquid ejecting portion 29 to move. That is, the control portion 48 may cause maintenance to be performed for causing the liquid ejecting portion 29 located at the closed position CP to eject liquid at the start of printing. The control portion 48 may increase an amount of liquid ejected from the liquid ejecting portion 29 to the closed space forming portion 40 while performing maintenance once as the number of stops increases.

The control portion 48 may change an amount of liquid ejected by the liquid ejecting portion 29, by changing the number of ejects, which is the number of droplets ejected by the liquid ejecting portion 29. In other words, the control portion 48 may increase the amount of liquid by increasing the number of ejects. The number of ejects of the present exemplary embodiment is the number of droplets that one nozzle 36 is caused to eject. The control portion 48 causes each nozzle 36 to eject a droplet.

When the number of stops is 0, the control portion 48 may set the number of ejects to 100 drops, for example. When the number of stops is one, the control portion 48 may change the number of ejects to 300 drops, for example. Similarly, the control portion 48 may set the number of ejects to 900 drops when the number of stops is two, for example, may set the number of ejects to 3000 drops when the number of stops is three, for example, and may set the number of ejects to 9000 drops when the number of stops is four, for example.

The control portion 48 causes the flushing to be performed while printing is performed. The control portion 48 may cause the liquid to be ejected and the flushing to be performed, while the liquid ejecting portion 29 is paused at the closed position CP to change a moving direction.

The control portion 48 causes the discharging portion 41 to discharge liquid in the closed space forming portion 40, when an amount of liquid detected by the detector 42 or the calculation unit 49 reaches a prescribed value. That is, the control portion 48 causes the empty suction to be performed, when the liquid ejecting portion 29 ejected liquid of the prescribed value or more to the closed space forming portion 40.

The control portion 48 of the present exemplary embodiment causes printing to be interrupted to cause the empty suction to be performed. The control portion 48 causes movement of the liquid ejecting portion 29 to be stopped while the empty suction is performed. As a result, for example, even when a part of the maintenance unit 30 overlaps with a movement region of the liquid ejecting portion 29 or the carriage 27 in association with the empty suction, a possibility can be reduced that the liquid ejecting portion 29 or the carriage 27 hits the maintenance unit 30. When movement of the liquid ejecting portion 29 and the empty suction are alternately performed, the motor 34 for causing the liquid ejecting portion 29 to move may cause to drive the discharging portion 41.

Effects of the present exemplary embodiment will be described.

(1) The closed space forming portion 40 forms the closed space 35 between the closed space forming portion 40 and the liquid ejecting portion 29 located at the closed position CP. Therefore, as the number of stops the liquid ejecting portion 29 is stopped at a position other than the closed position CP for the prescribed time or longer increases, solvent evaporates and thus it becomes difficult to discharge liquid in the closed space forming portion 40. That is, as the number of stops increases, a state of the closed space forming portion 40 worsens, and an amount of liquid that can be accommodated reduces. When an amount of liquid ejected from the liquid ejecting portion 29 to the closed space forming portion 40 reaches a prescribed value, the control portion 48 causes the liquid in the closed space forming portion 40 to be discharged. Since the control portion 48 reduces the prescribed value as the number of stops increases, the liquid can be caused to be discharged from the closed space forming portion 40 at timing in accordance with the state of the closed space forming portion 40. Thus, a frequency at which printing is stopped can be reduced.

(2) The control portion 48 changes the drive time of the discharging portion 41 in accordance with the number of stops. When the number of stops is large, the liquid is likely to remain in the closed space forming portion 40. Therefore, when the number of stops is large, an amount of the liquid remaining in the closed space forming portion 40 can be caused to be reduced by increasing the drive time of the discharging portion 41. When the number of stops is small, the liquid is unlikely to remain in the closed space forming portion 40. Therefore, even when the drive time of the discharging portion 41 is short, the liquid can be caused to be discharged from the closed space forming portion 40. By reducing the drive time of the discharging portion 41, time for causing printing to be stopped can be shortened.

(3) When the closed space 35 is formed by the closed space forming portion 40 where liquid from which solvent evaporated remains, the remaining liquid deprives liquid in the nozzle 36 of solvent, and viscosity of the liquid in the nozzle 36 may be caused to be increased. In this regard, the control portion 48 increases an amount of liquid ejected while performing maintenance once as the number of stops increases. Therefore, when the number of stops is large, and the viscosity of the liquid in the nozzle 36 is likely to increase, by increasing an amount of liquid caused to be discharged from the nozzle 36, the liquid with increased viscosity can be caused to be discharged. When the number of stops is small, and the viscosity of the liquid in the nozzle 36 is less likely to increase, by reducing the amount of liquid caused to be discharged from the nozzle 36, liquid consumption can be reduced.

(4) The control portion 48 includes the calculation unit 49 as the detector 42. That is, the calculation unit 49 detects an amount of liquid ejected from the liquid ejecting portion 29 to the closed space forming portion 40 by calculation. Therefore, the configuration can be simplified compared to a case where the detector 42 is separately provided.

(5) The control portion 48, before causing liquid in the closed space forming portion 40 to be discharged, causes the second liquid to be ejected into the closed space forming portion 40. In the second liquid having a low defoaming property, it is easy to form a meniscus in the porous member 43 compared to the first liquid having a high defoaming property. Therefore, when the discharging portion 41 causes liquid to be discharged from the closed space forming portion 40, the liquid is easily suctioned from the entire porous member 43. Thus, an emission property of the liquid absorbed by the porous member 43 can be improved.

(6) The liquid ejecting portion 29 ejects the second liquid after ejecting the first liquid. That is, the closed space forming portion 40 accommodates the second liquid after accommodating the first liquid. Thus, a meniscus is easily formed in an upside of the porous member 43, and an emission property of liquid absorbed by the porous member 43 can be improved.

(7) The liquid ejecting portion 29 ejects the second liquid, which is more than the first liquid. Therefore, in a liquid accommodated by the closed space forming portion 40, a ratio of the second liquid is greater than a ratio of the first liquid. Thus, an emission property of the liquid absorbed by the porous member 43 can be improved.

(8) The number of stops includes the number of times a plug is pulled out during electric power supply. Thus, in a normal usage where power is turned off and then a plug is pulled out, the control portion 48 causes liquid in the closed space forming portion 40 to be discharged based on a large prescribed value. Accordingly, the liquid can be caused to be discharged from the closed space forming portion 40 at timing in accordance with a usage situation.

(9) The number of stops includes the number of stops along with jamming of the medium 23. Thus, when jamming of the medium 23 does not occur, the control portion 48 causes liquid in the closed space forming portion 40 to be discharged based on a large prescribed value. Accordingly, the liquid can be caused to be discharged from the closed space forming portion 40 at timing in accordance with a usage situation.

The present exemplary embodiment described above may be modified as follows. The present exemplary embodiment and modified examples thereof to be described below may be implemented in combination within a range in which a technical contradiction does not arise.

The liquid ejecting portion 29 may eject liquid to the closed space forming portion 40 while moving to perform flushing.

The number of stops may include the number of times the liquid ejecting portion 29 is stopped for a prescribed time or longer at a position other than the closed position CP due to influence of a power supply interruption such as a power failure, for example.

The control portion 48, after causing the liquid ejecting portion 29 to be stopped at the closed position CP, may cause the closed space forming portion 40 located at a separation position to move to a capping position and to perform capping. For example, when the liquid ejecting portion 29 is stopped at the closed position CP and then electric power supply to the liquid ejecting device 11 is interrupted before the closed space forming portion 40 reaches the capping position, the closed space forming portion 40 may be left without forming the closed space 35. As a result, the number of stops may include the number of times the liquid ejecting portion 29 is stopped for a prescribed time or longer in a state where the closed space 35 is not formed.

Liquid that the liquid ejecting portion 29 can eject may be of one type. The liquid ejecting device 11 may perform monochrome printing by causing the liquid ejecting portion 29 to eject a black ink, for example.

Even when the liquid ejecting portion 29 ejects a plurality of types of liquids, an amount of a first liquid and an amount of a second liquid ejected by the liquid ejecting portion 29 for flushing may be the same. The amount of the second liquid may be less than the amount of the first liquid.

The liquid ejecting portion 29 may eject the first liquid and the second liquid simultaneously to the closed space forming portion 40.

After ejecting the second liquid to the closed space forming portion 40, the liquid ejecting portion 29 may eject the first liquid to the closed space forming portion 40.

The control portion 48 may cause the second liquid to be ejected from the liquid ejecting portion 29 into the closed space forming portion 40, while causing the discharging portion 41 to discharge liquid in the closed space forming portion 40. The control portion 48, after causing ejecting of the second liquid to be stopped, may cause the pump 46 to drive for only drive time corresponding to the number of stops.

At least one of the number of ejects and drive time may be constant regardless of the number of stops. The liquid ejecting portion 29 may change a size of a droplet to be ejected. The calculation unit 49 may calculate an amount of liquid ejected from the liquid ejecting portion 29 to the closed space forming portion 40 based on the number of ejects and the size of the droplet.

The liquid ejecting device 11 may be a liquid ejecting device that injects or ejects liquids other than ink. A state of liquid ejected as a small amount of droplets from the liquid ejecting device also includes granular, tear-like, and thread-like. It is sufficient that the liquid here is a material that can be caused to be ejected from the liquid ejecting device. For example, it is sufficient that the liquid is in a state where a substance is in a liquid state, and the liquid includes fluids such as a liquid substance with high or low viscosity, a sol, a gel water, other inorganic solvents, an organic solvent, a solution, a liquid resin, a liquid metal, a metal melt, and the like. The liquid includes not only liquid as a state of a substance, but also includes particles of a functional material made of a solid such as pigment or metal particles dissolved, dispersed or mixed in a solvent, and the like. Representative examples of the liquid include ink, liquid crystals, and the like as described in the above exemplary embodiments. Here, the ink includes various liquid compositions such as a general aqueous ink and a solvent ink, a gel ink, and a hot-melt ink. Specific examples of the liquid ejecting device include, for example, a device that ejects liquid including materials such as an electrode material and a color material used in manufacture of liquid crystal displays, electroluminescent displays, surface emitting displays, color filters and the like in a dispersed or dissolved form. The liquid ejecting device may be a device ejecting bioorganic substances used for biochip manufacturing, a device used as a precision pipette and ejecting liquid to be a sample, a printing apparatus, a micro dispenser, or the like. The liquid ejecting device may be a device ejecting lubricant to a precision machine such as a clock or a camera in a pinpoint manner, a device ejecting a transparent resin liquid such as an ultraviolet cure resin or the like on a substrate for forming a tiny hemispherical lens, an optical lens, or the like used for an optical communication element and the like. The liquid ejecting device may be a device ejecting an etching solution such as acid or alkali to etch a substrate or the like.

Hereinafter, technical concepts and effects thereof that are understood from the above-described exemplary embodiments and modified examples will be described.

(A) A liquid ejecting device includes a liquid ejecting portion configured to eject liquid from a nozzle, a closed space forming portion having, inside thereof, a porous member configured to absorb the liquid, and configured to form a closed space in which the nozzle opens, an discharging portion configured to discharge the liquid in the closed space forming portion, and a control portion configured to, when an amount of the liquid ejected from the liquid ejecting portion to the closed space forming portion reaches a prescribed value, cause the discharging portion to discharge the liquid in the closed space forming portion, wherein the liquid ejecting portion is movable from a closed position where the closed space is formed, and the control portion decreases the prescribed value as the number of stops increases, the number of stops being the number of times the liquid ejecting portion is stopped for a prescribed time or longer at a position other than the closed position.

With this configuration, the closed space forming portion forms the closed space between the closed space forming portion and the liquid ejecting portion located at the closed position. Therefore, as the number of stops the liquid ejecting portion is stopped at a position other than the closed position for the prescribed time or longer increases, solvent evaporates and thus it becomes difficult to discharge liquid in the closed space forming portion. That is, as the number of stops increases, a state of the closed space forming portion worsens, and an amount of liquid that can be accommodated reduces. When an amount of liquid ejected from the liquid ejecting portion to the closed space forming portion reaches the prescribed value, the control portion causes the liquid in the closed space forming portion to be discharged. Since the control portion reduces the prescribed value as the number of stops increases, the liquid can be caused to be discharged from the closed space forming portion at timing in accordance with the state of the closed space forming portion. Thus, a frequency at which printing is stopped can be reduced.

(B) In the liquid ejecting device, the control portion, when causing the discharging portion to discharge the liquid in the closed space forming portion, may increase drive time thereof, as the number of stops increases.

According to this configuration, the control portion changes the drive time of the discharging portion in accordance with the number of stops. When the number of stops is large, the liquid is likely to remain in the closed space forming portion. Therefore, when the number of stops is large, an amount of the liquid remaining in the closed space forming portion can be caused to be reduced by increasing the drive time of the discharging portion. When the number of stops is small, the liquid is unlikely to remain in the closed space forming portion. Therefore, even when the drive time of the discharging portion is short, the liquid can be caused to be discharged from the closed space forming portion. By reducing the drive time of the discharging portion, time for causing printing to be stopped can be shortened.

(C) In the liquid ejecting device, the control portion may increase an amount of liquid ejected from the liquid ejecting portion to the closed space forming portion while performing maintenance once as the number of stops increases.

When the closed space is formed by the closed space forming portion where liquid from which solvent evaporated remains, the remaining liquid deprives liquid in the nozzle of solvent, and viscosity of the liquid in the nozzle may be caused to be increased. In this regard, according to this configuration, the control portion increases the amount of liquid ejected while performing maintenance once as the number of stops increases. Therefore, when the number of stops is large, and the viscosity of the liquid in the nozzle is likely to increase, by increasing an amount of liquid caused to be discharged from the nozzle, the liquid with increased viscosity can be caused to be discharged. When the number of stops is small, and the viscosity of the liquid in the nozzle is less likely to increase, by reducing the amount of liquid caused to be discharged from the nozzle, liquid consumption can be reduced.

(D) In the liquid ejecting device, the control portion may include a calculation unit for calculating an amount of the liquid ejected from the liquid ejecting portion to the closed space forming portion.

According to this configuration, the control portion includes the calculation unit. That is, the calculation unit detects an amount of liquid ejected from the liquid ejecting portion to the closed space forming portion by calculation. Accordingly, the configuration can be simplified compared to a case where a detector is provided separately for detecting the amount of the liquid ejected from the liquid ejecting portion to the closed space forming portion.

(E) In the liquid ejecting device, the liquid ejecting portion is capable of ejecting a first liquid and a second liquid as the liquid, the second liquid has a defoaming property lower than that of the first liquid, and the control portion, before causing the discharging portion to discharge the liquid in the closed space forming portion, may cause the second liquid to be ejected from the liquid ejecting portion into the closed space forming portion.

According to this configuration, the control portion, before causing liquid in the closed space forming portion to be discharged, causes the second liquid to be ejected into the closed space forming portion. In the second liquid having a low defoaming property, it is easy to form a meniscus in the porous member compared to the first liquid having a high defoaming property. Therefore, when the discharging portion causes liquid to be discharged from the closed space forming portion, the liquid is easily suctioned from the entire porous member. Thus, an emission property of the liquid absorbed by the porous member can be improved.

(F) In the liquid ejecting device, the liquid ejecting portion is capable of ejecting a first liquid and a second liquid as the liquid, the second liquid has a defoaming property lower than that of the first liquid, and the liquid ejecting portion may eject the second liquid to the closed space forming portion, after ejecting the first liquid into the closed space forming portion.

According to this configuration, the liquid ejecting portion ejects the second liquid after ejecting the first liquid. That is, the closed space forming portion accommodates the second liquid after accommodating the first liquid. Thus, a meniscus is easily formed in an upside of the porous member, and an emission property of liquid absorbed by the porous member can be improved.

(G) In the liquid ejecting device, the liquid ejecting portion is capable of ejecting a first liquid and a second liquid as the liquid, the second liquid has a defoaming property lower than that of the first liquid, and an amount of the second liquid ejected by the liquid ejecting portion to the closed space forming portion may be greater than an amount of the first liquid ejected by the liquid ejecting portion to the closed space forming portion.

According to this configuration, the liquid ejecting portion ejects the second liquid, which is more than the first liquid. Therefore, in a liquid accommodated by the closed space forming portion, a ratio of the second liquid is greater than a ratio of the first liquid. Thus, an emission property of liquid absorbed by the porous member can be improved.

(H) In the liquid ejecting device, the number of stops may include the number of times the liquid ejecting portion is stopped for the prescribed time or longer at a position other than the closed position when the liquid ejecting device is unplugged while being supplied with electric power.

According to this configuration, the number of stops includes the number of times a plug is pulled out during electric power supply. Thus, in a normal usage where power is turned off and then a plug is pulled out, the control portion causes liquid in the closed space forming portion to be discharged based on a large prescribed value. Accordingly, the liquid can be caused to be discharged from the closed space forming portion at timing in accordance with a usage situation.

(I) In the liquid ejecting device, the number of stops may include the number of times the liquid ejecting portion is stopped for the prescribed time or longer at a position other than the closed position due to the medium jamming on a transport path.

According to this configuration, the number of stops includes the number of stops along with jamming of the medium. Thus, when jamming of the medium does not occur, the control portion causes liquid in the closed space forming portion to be discharged based on a large prescribed value. Accordingly, the liquid can be caused to be discharged from the closed space forming portion at timing in accordance with a usage situation.

What is claimed is:

1. A liquid ejecting device, comprising:

a liquid ejecting portion configured to eject liquid from a nozzle;

a closed space forming portion including, inside thereof, a porous member configured to absorb the liquid, wherein the closed space forming portion is configured to form a closed space in which the nozzle opens;

a discharging portion configured to discharge the liquid in the closed space forming portion; and a control portion configured to, when an amount of the liquid ejected from the liquid ejecting portion into the closed space forming portion reaches a prescribed value, cause the discharging portion to discharge the liquid in the closed space forming portion, wherein the liquid ejecting portion is movable from a closed position where the closed space is formed, and the control portion decreases the prescribed value as a number of stops increases, the number of stops being the number of times the liquid ejecting portion is stopped for a prescribed time or longer at a position other than the closed position.

2. The liquid ejecting device according to claim 1, wherein the control portion, when causing the discharging portion to discharge the liquid in the closed space forming portion, increases drive time thereof, as the number of stops increases.

3. The liquid ejecting device according to claim 1, wherein the control portion increases the amount of the liquid ejected from the liquid ejecting portion into the closed space forming portion while performing maintenance once as the number of stops increases.

4. The liquid ejecting device according to claim 1, wherein the control portion includes a calculation unit for calculating the amount of the liquid ejected from the liquid ejecting portion into the closed space forming portion.

5. The liquid ejecting device according to claim 4, wherein the liquid ejecting portion is configured to eject a first liquid and a second liquid as the liquid, the second liquid has a defoaming property lower than that of the first liquid, and the control portion, before causing the discharging portion to discharge the liquid into the closed space forming portion, causes the liquid ejecting portion to eject the second liquid into the closed space forming portion.

6. The liquid ejecting device according to claim 4, wherein the liquid ejecting portion is configured to eject a first liquid and a second liquid as the liquid, the second liquid has a defoaming property lower than that of the first liquid, and the control portion, after causing the liquid ejecting portion to eject the first liquid into the closed space forming portion, causes the liquid ejecting portion to eject the second liquid into the closed space forming portion.

7. The liquid ejecting device according to claim 4, wherein the liquid ejecting portion is configured to eject a first liquid and a second liquid as the liquid, the second liquid has a defoaming property lower than that of the first liquid, and an amount of the second liquid ejected by the liquid ejecting portion into the closed space forming portion is greater than an amount of the first liquid ejected by the liquid ejecting portion into the closed space forming portion.

8. The liquid ejecting device according to claim 1, wherein the number of stops includes the number of times the liquid ejecting portion is stopped for the prescribed time or longer at a position other than the closed position when the liquid ejecting device is unplugged while being supplied with electric power.

9. The liquid ejecting device according to claim 8, wherein the number of stops includes the number of times the liquid ejecting portion is stopped for the prescribed time or longer at a position other than the closed position due to a medium jamming on a transport path.

10. The liquid ejecting device according to claim 1, further comprising a detector configured to detect the amount of the liquid ejected from the liquid ejecting portion into the closed space forming portion.

* * * * *